US012274353B2

(12) United States Patent
Hung et al.

(10) Patent No.: US 12,274,353 B2
(45) Date of Patent: Apr. 15, 2025

(54) FLUID DISPENSING SCRUBBER

(71) Applicant: TECHTRONIC CORDLESS GP, Anderson, SC (US)

(72) Inventors: Lam Chin Hung, Hong Kong (CN); Casey R. Izard, Easley, SC (US); Adrianna N. Johnson, Greenville, SC (US)

(73) Assignee: Techtronic Cordless GP, Anderson, SC (US)

( * ) Notice: Subject to any disclaimer, the term of this patent is extended or adjusted under 35 U.S.C. 154(b) by 402 days.

(21) Appl. No.: 17/745,245

(22) Filed: May 16, 2022

(65) Prior Publication Data

US 2022/0369801 A1 Nov. 24, 2022

Related U.S. Application Data

(60) Provisional application No. 63/190,559, filed on May 19, 2021.

(51) Int. Cl.
*A46B 13/04* (2006.01)
*A46B 5/00* (2006.01)
(Continued)

(52) U.S. Cl.
CPC ............ *A46B 13/04* (2013.01); *A46B 5/0058* (2013.01); *A46B 11/002* (2013.01);
(Continued)

(58) Field of Classification Search
CPC ... A46B 5/0058; A46B 5/0075; A46B 5/0083; A46B 11/002; A46B 2200/30;
(Continued)

(56) References Cited

U.S. PATENT DOCUMENTS

| | | | | |
|---|---|---|---|---|
| 1,994,085 A | 3/1935 | Jackson | | |
| 2,801,431 A * | 8/1957 | Eastis | .................... | A46B 13/04 15/328 |

(Continued)

FOREIGN PATENT DOCUMENTS

| | | | |
|---|---|---|---|
| CN | 2131448 Y | 5/1993 | |
| CN | 2278425 Y | 4/1998 | |

(Continued)

OTHER PUBLICATIONS

Partial European Search Report for Application No. 22173963.4 dated Oct. 19, 2022 (10 pages).

*Primary Examiner* — Randall E Chin
(74) *Attorney, Agent, or Firm* — Michael Best & Friedrich LLP

(57) ABSTRACT

A fluid dispensing scrubber includes a shaft having a first end and a second end; a fluid inlet configured to receive a first fluid from an external source; a reservoir configured to store a second fluid; a valve assembly configured to selectively mix the first fluid and the second fluid; a scrubbing head supported adjacent the first end of the shaft, the scrubbing head including a brush and a motor operable to rotate the brush; a battery pack supported adjacent the second end, the battery pack operable to provide power to the motor; and a dispensing nozzle configured to selectively dispense one or both of the first fluid and the second fluid, the nozzle supported on an exterior surface of the scrubbing head.

15 Claims, 15 Drawing Sheets

(51) Int. Cl.

| | |
|---|---|
| ***A46B 11/00*** | (2006.01) |
| ***A46B 13/00*** | (2006.01) |
| ***A47L 11/283*** | (2006.01) |
| ***A47L 11/40*** | (2006.01) |
| ***B05B 7/24*** | (2006.01) |
| ***B05B 15/654*** | (2018.01) |

(52) U.S. Cl.
CPC ........ *A46B 11/0072* (2013.01); *A46B 13/008* (2013.01); *A47L 11/283* (2013.01); *A47L 11/4083* (2013.01); *B05B 7/2443* (2013.01); *B05B 15/654* (2018.02); *A46B 2200/30* (2013.01)

(58) Field of Classification Search
CPC ..... A46B 13/04; A46B 13/008; A47L 11/282; A47L 11/283; A47L 11/408; A47L 11/4083; B05B 7/2443; B05B 7/2497; B05B 15/654
USPC ............... 251/208, 209; 239/569, 576, 581.1
See application file for complete search history.

(56) References Cited

U.S. PATENT DOCUMENTS

| | | | | |
|---|---|---|---|---|
| 2,986,764 | A | 6/1961 | Krammes | |
| 3,024,487 | A | 3/1962 | Jones et al. | |
| 3,101,505 | A | 8/1963 | Belicka et al. | |
| 3,731,334 | A | 5/1973 | Carbonell | |
| 4,720,883 | A | 1/1988 | Sanchez | |
| 5,356,076 | A * | 10/1994 | Bishop | B05B 7/0425 239/311 |
| 5,649,334 | A | 7/1997 | Henriquez et al. | |
| 6,463,616 | B1 | 10/2002 | Morokutti | |
| 6,748,619 | B2 * | 6/2004 | Quach | A46B 13/04 15/29 |
| 7,008,130 | B1 | 3/2006 | Hill | |
| 7,040,830 | B2 | 5/2006 | Kliegman et al. | |
| 7,363,673 | B2 | 4/2008 | Schonewille et al. | |
| 7,481,594 | B2 | 1/2009 | Martin | |
| 7,703,165 | B2 | 4/2010 | Wilkins | |
| 7,707,674 | B2 | 5/2010 | Schonewille et al. | |
| 7,743,683 | B2 | 6/2010 | Dayton et al. | |
| 7,775,736 | B2 | 8/2010 | Song | |
| 7,913,345 | B2 | 3/2011 | Dayton et al. | |
| 7,926,141 | B2 | 4/2011 | Dayton et al. | |
| 7,979,940 | B1 | 7/2011 | Wilkins | |
| 8,024,995 | B2 | 9/2011 | Dayton et al. | |
| 8,069,520 | B2 | 12/2011 | Mattucci et al. | |
| D658,384 | S | 5/2012 | Pender | |
| 8,220,098 | B2 | 7/2012 | Wilkins | |
| 8,607,393 | B2 | 12/2013 | Wilkins | |
| 9,044,791 | B2 | 6/2015 | Wilkins | |
| 9,173,538 | B2 | 11/2015 | Sandahl | |
| 9,332,831 | B2 | 5/2016 | Pender | |
| 9,380,859 | B2 | 7/2016 | Pender | |
| 9,844,259 | B2 | 12/2017 | Pender | |
| 2002/0112741 | A1 | 8/2002 | Pieroni et al. | |
| 2002/0129835 | A1 | 9/2002 | Pieroni et al. | |
| 2002/0148056 | A1 | 10/2002 | Morokutti | |
| 2004/0237228 | A1 | 12/2004 | King et al. | |
| 2005/0278880 | A1 | 12/2005 | Pieroni et al. | |
| 2006/0218752 | A1 | 10/2006 | Potempa | |
| 2007/0020030 | A1 | 1/2007 | Goulet et al. | |
| 2008/0060149 | A1 * | 3/2008 | Wu | A46B 5/0095 15/28 |
| 2008/0173138 | A1 | 7/2008 | Dayton et al. | |
| 2008/0201877 | A1 | 8/2008 | Sengewald et al. | |
| 2010/0067972 | A1 | 3/2010 | Ashworth et al. | |
| 2012/0099920 | A1 | 4/2012 | Wang | |
| 2021/0000318 | A1 | 1/2021 | Pampel | |

FOREIGN PATENT DOCUMENTS

| | | | |
|---|---|---|---|
| CN | 2326175 | Y | 6/1999 |
| CN | 2693359 | Y | 4/2005 |
| CN | 201019220 | Y | 2/2008 |
| CN | 201042279 | Y | 4/2008 |
| CN | 201064424 | Y | 5/2008 |
| CN | 203153642 | U | 8/2013 |
| CN | 107125913 | A | 9/2017 |
| CN | 206462954 | U | 9/2017 |
| CN | 207734116 | U | 8/2018 |
| CN | 109567689 | A | 4/2019 |
| CN | 111528724 | A | 8/2020 |
| CN | 109199267 | B | 12/2020 |
| DE | 102016217098 | A1 | 3/2018 |
| DE | 202019102533 | U1 | 5/2019 |
| EP | 1529478 | A2 | 5/2005 |
| WO | 2013149449 | A1 | 10/2013 |

* cited by examiner

FLUID DISPENSING SCRUBBER

CROSS-REFERENCE TO RELATED APPLICATION

This application claims the benefit of prior-filed, U.S. Provisional Patent Application No. 63/190,559, filed May 19, 2021, the entire contents of which are incorporated by reference.

TECHNICAL FIELD

The present disclosure relates to scrubbing devices, and more particularly to fluid dispensing scrubbers or the like.

BACKGROUND

In conventional systems, water and soap dispensing scrubbers include a scrubbing brush and one or more fluid spray nozzles. The fluid spray nozzle may project through a brush head.

SUMMARY

In one independent aspect, a fluid dispensing scrubber includes a shaft having a first end and a second end; a fluid inlet configured to receive a first fluid from an external source; a reservoir configured to store a second fluid; a valve assembly configured to selectively mix the first fluid and the second fluid; a scrubbing head supported adjacent the first end of the shaft, the scrubbing head including a brush and a motor operable to rotate the brush; a battery pack supported adjacent the second end, the battery pack operable to provide power to the motor; and a dispensing nozzle configured to selectively dispense one or both of the first fluid and the second fluid, the nozzle supported on an exterior surface of the scrubbing head.

In another independent aspect, a fluid dispensing scrubber includes a shaft including a first end and a second end; a scrubbing head supported adjacent the first end of the shaft, the scrubbing head including a brush and a motor operable to rotate the brush; a battery pack supported adjacent the second end, the battery pack operable to provide power to the motor; a fluid inlet configured to receive a first fluid from an external source; a reservoir configured to store a second fluid; and a valve assembly configured to selectively mix the first fluid and the second fluid, the valve assembly movable between a first mode, a second mode, and a third mode. In the first mode, the valve assembly permits a mixture of the first fluid and the second fluid to be dispensed from the nozzle. In the second mode, the valve assembly permits only the first fluid to be dispensed from the nozzle. In the third mode, the valve assembly prevents the first fluid from being dispensed from the nozzle.

In yet another independent aspect, a fluid dispensing scrubber includes a shaft including a first end and a second end, the shaft including a first portion and a second portion slidably coupled to the first portion; a grip portion coupled to the shaft; a pivot joint positioned adjacent the first end of the shaft; a fluid inlet for receiving a rinsing fluid from an external source; a reservoir configured to store a second fluid different from the first fluid; a valve assembly configured to selectively mix the first fluid and the second fluid; a scrubbing head coupled to the pivot joint, the scrubbing head pivotable relative to the shaft, the scrubbing head including a brush, a motor, and a chuck operable to be rotated by the motor, the chuck coupled to the brush and transmitting a torque from the motor to the brush; a battery pack supported adjacent the second end of the shaft, the battery pack operable to provide power to the motor; and a dispensing nozzle configured to selectively dispense one or both of the first fluid and the second fluid, the nozzle supported on an exterior surface of the scrubbing head.

Other features and aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Figure 1:
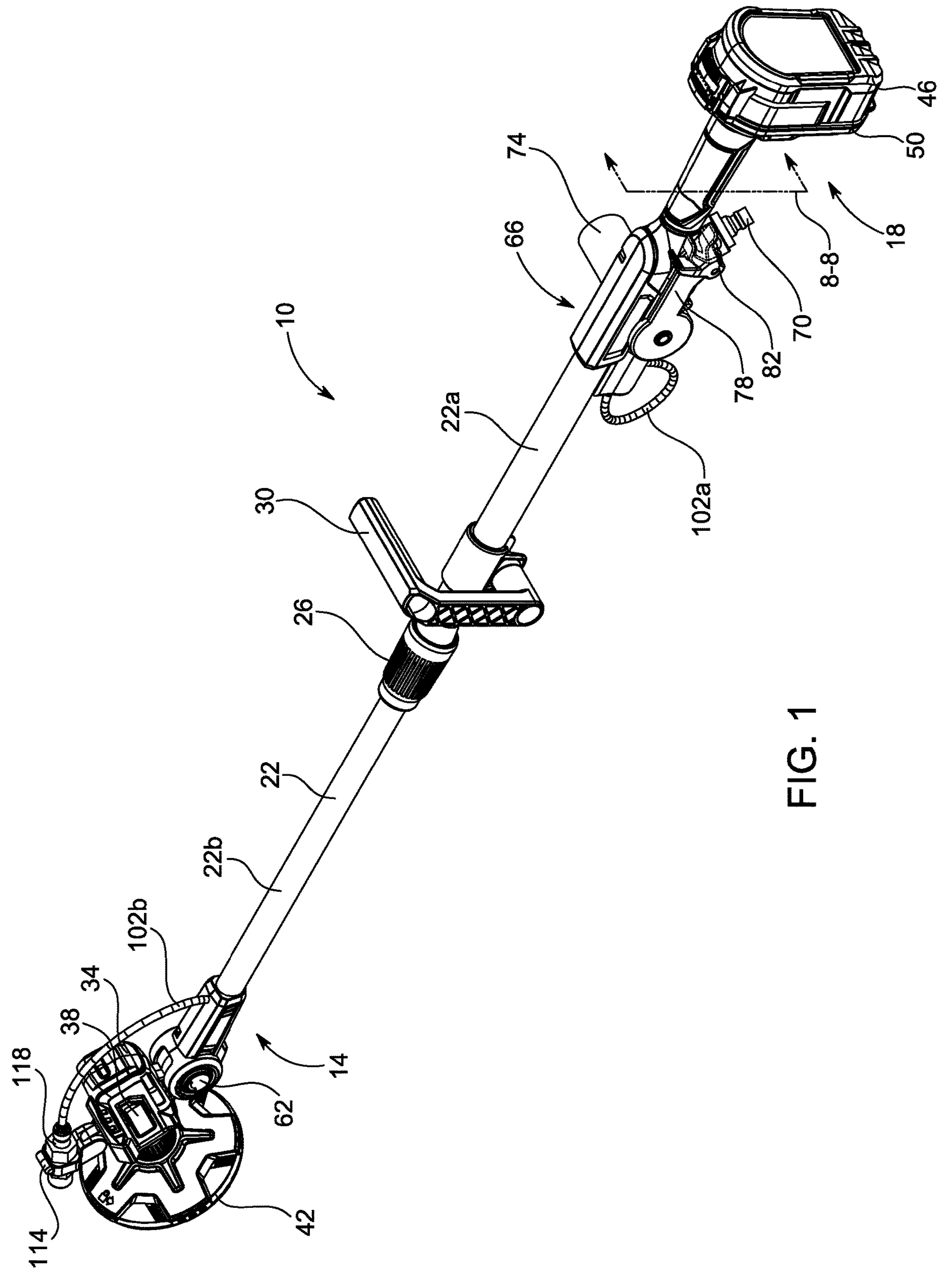
FIG. 1 is a perspective view of a fluid dispensing scrubber.
Figure 2:
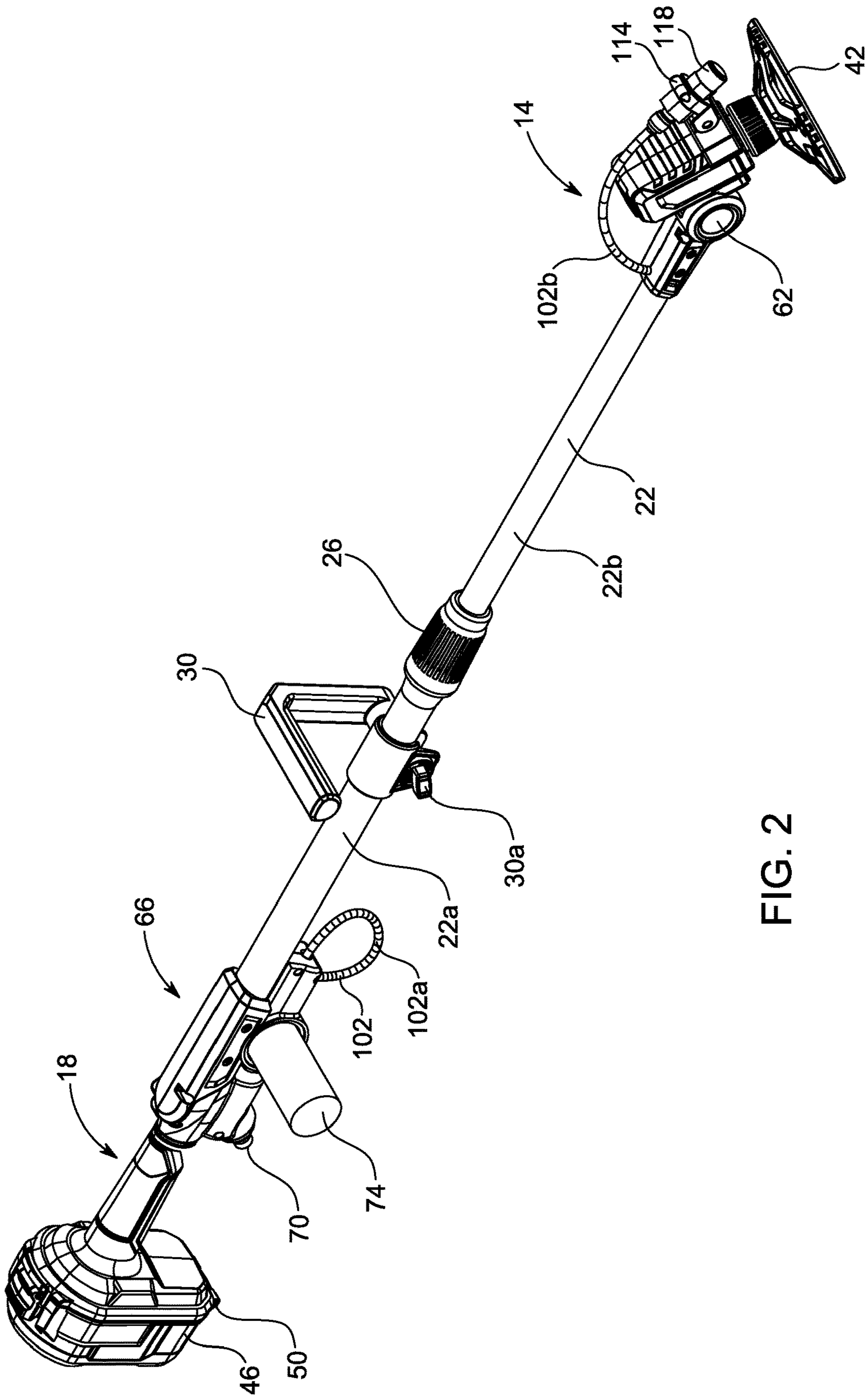
FIG. 2 is another perspective view of the fluid dispensing scrubber of FIG. 1.

FIGS. 1 and 2 illustrate a fluid dispensing scrubber 10 (e.g., a power scrubber 10) including a first end or scrubbing end 14 and a second end or base end 18. A shaft 22 connects the scrubbing end 14 to the base end 18. The shaft 22 may be a telescoping shaft including one or more telescoping portions (e.g., a first portion 22*a* and a second portion 22*b* that slide/telescope relative to each other), and a coupler 26 connecting the first portion 22*a* and the second portion 22*b*. In the illustrated embodiment, a handle 30 surrounds the first portion 22*a* and is secured by a fastener 30*a* to the first portion 22*a* at a position between the base end 18 and the coupler 26. A scrubber head 34 is positioned adjacent the scrubbing end 14. The scrubber head 34 supports a motor 38. The motor 38 is operably coupled to a brush 42 and is in electrical communication with a battery pack 46. The brush 42 is adjacent the scrubbing end 14 and is operable to scrub a surface upon operation of the motor 38. In the illustrated embodiment, the battery pack 46 engages a battery receptacle 50 adjacent the base end 18. One or more wires 54 (FIGS. 7-9) pass through the telescopic shaft 22 to provide electrical communication between the battery pack 46 and the motor 38. A button 58 is provided on the exterior of the base end 18 to permit a user to control flow of power from the battery pack 46 to the motor 38 and to adjust operation of the motor 38.

Figure 3:
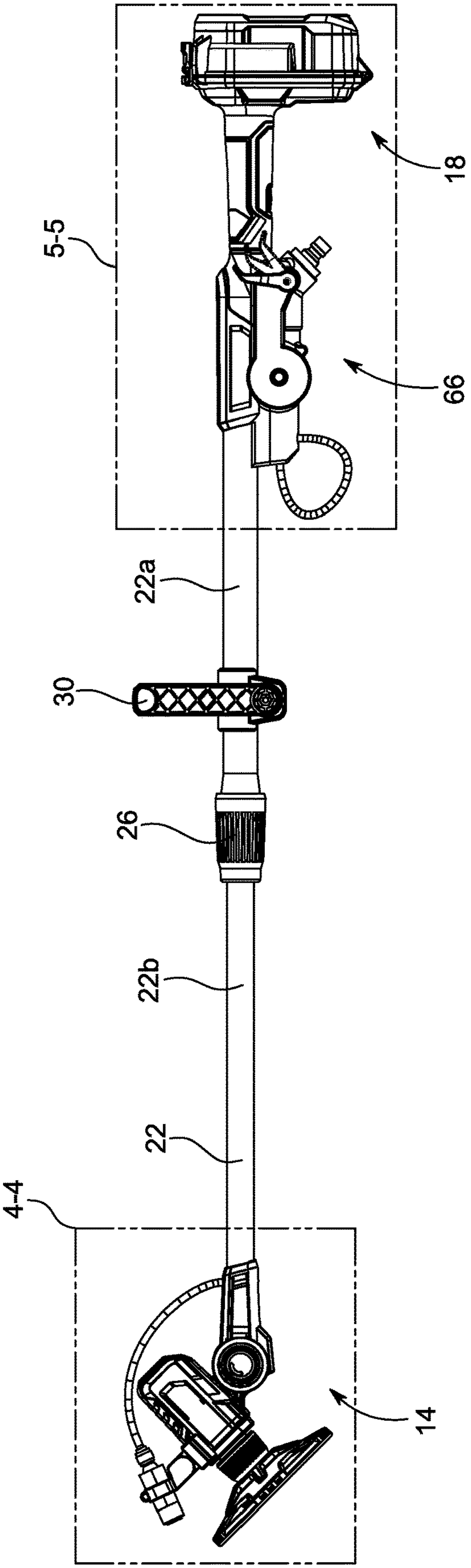
FIG. 3 is a side view of the fluid dispensing scrubber of FIG. 1.
Figure 4:
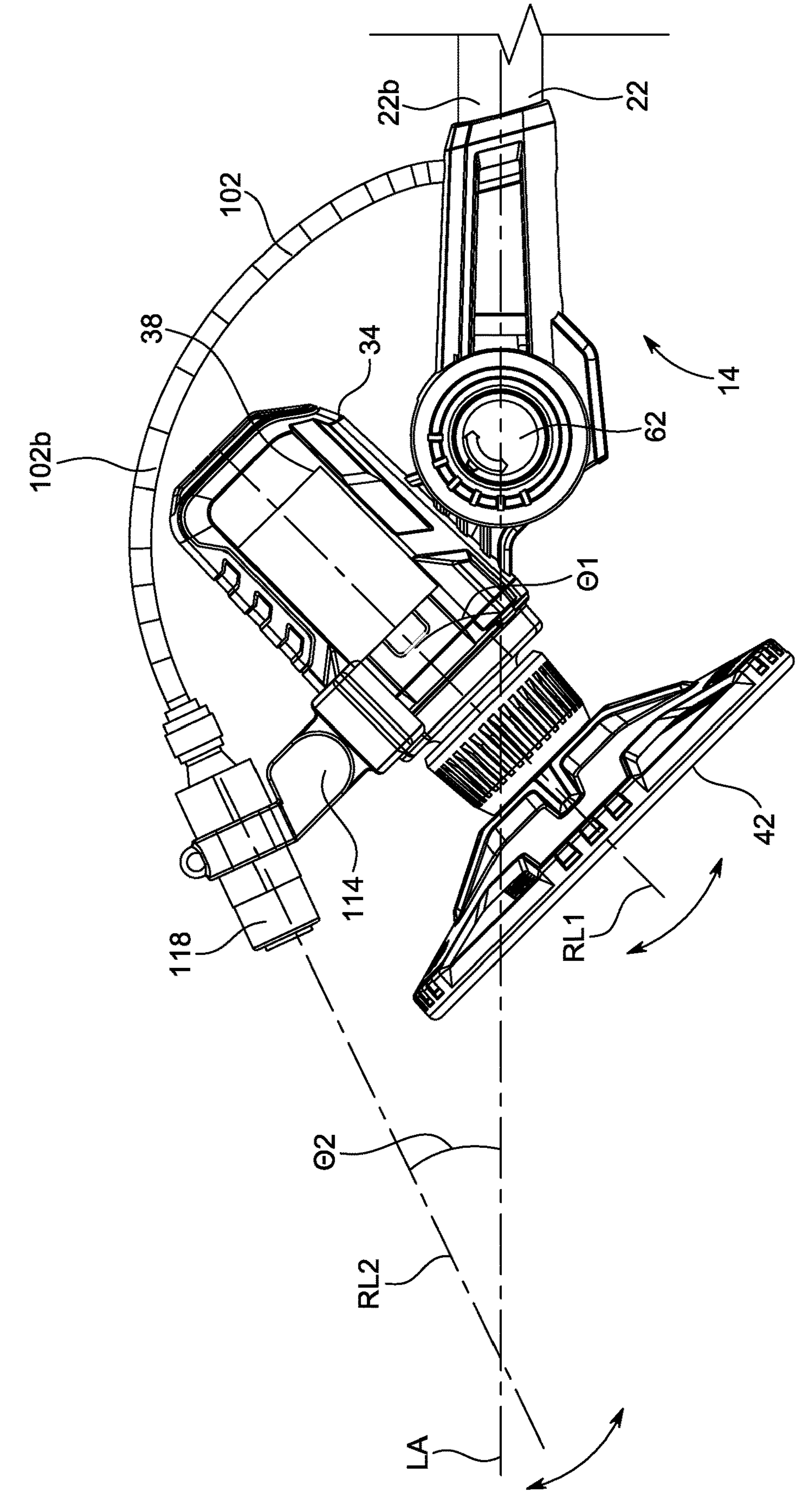
FIG. 4 is an enlarged side view of portion 4-4 of the fluid dispensing scrubber of FIG. 3.

As illustrated in FIGS. 3 and 4, the scrubber head 34 is supported for pivoting movement by a pivot joint 62. The pivot joint 62 is positioned proximate the scrubbing end 14, at an end of the second portion 22*b* opposite the coupler 26. As illustrated in FIG. 4, the telescopic shaft 22 extends along a longitudinal axis LA. A reference line RL1 extends through the scrubber head 34 and is substantially parallel to an axis of rotation of the brush 42. The reference line RL1 in the illustrated embodiment is oriented at an angle Θ1 relative to the longitudinal axis LA. The pivot joint 62 permits pivoting movement of the scrubber head 34, changing the orientation of the reference line RL1 relative to the longitudinal axis LA. In some constructions, the pivot joint 62 is lockable in a desired position to releasably secure the angle Θ1. In some constructions, the pivot joint 62 may be operable to permit the scrubber head 34 to be oriented parallel to the telescopic shaft 22. In other words, the reference line RL1 of the scrubber head 34 may extend parallel to the longitudinal axis LA.

Figure 5:
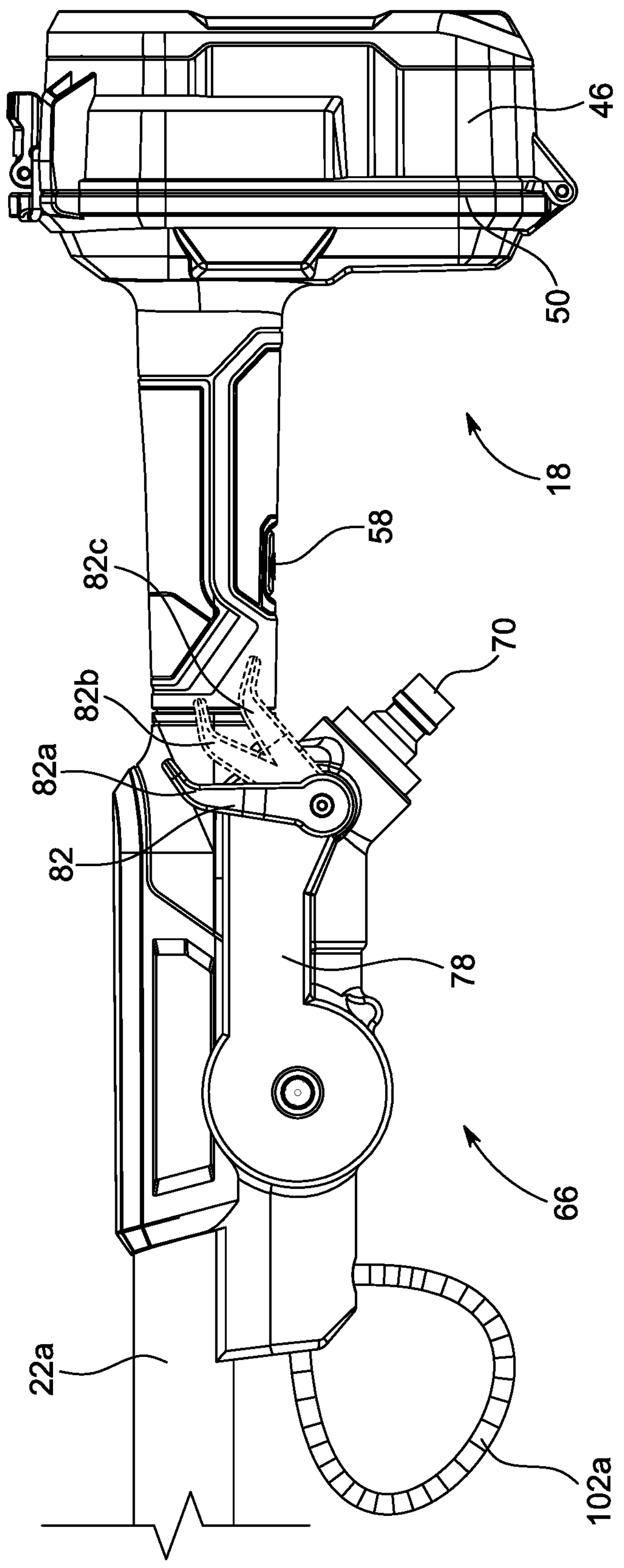
FIG. 5 is an enlarged side view of portion 5-5 of the fluid dispensing scrubber of FIG. 3, illustrating a mode selector assembly.
Figure 6:
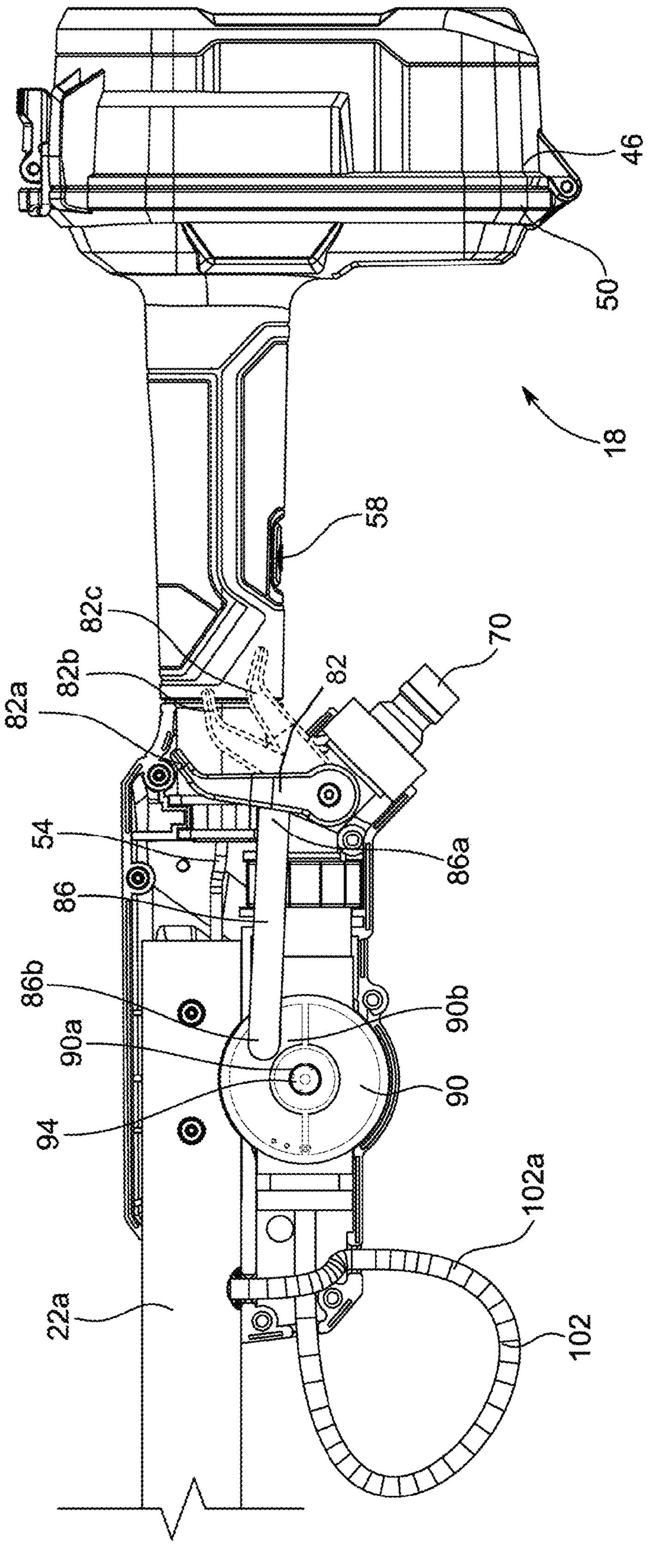
FIG. 6 is a side view of the fluid dispensing scrubber of FIG. 5, with a cover plate removed and illustrating the mode selector assembly.

As illustrated in FIGS. 3 and 5-9, the fluid dispensing scrubber 10 further includes a mode selector assembly or valve assembly 66 operable to change an operating mode of the fluid dispensing feature of the scrubber 10. With reference to FIG. 5, the scrubber 10 includes a fluid inlet nozzle 70 receiving fluid from an inlet fluid source. In the illustrated embodiment, the fluid inlet nozzle 70 receives water. The fluid dispensing scrubber 10 also includes an on-board reservoir 74 (FIG. 2) for holding a cleaning agent (e.g., soap or a detergent). In the illustrated embodiment, the reservoir 74 is transparent such that a user may observe the fill level of the reservoir 74 without detachment of the reservoir 74 from the scrubber 10. With reference to FIG. 5, a cover plate 78 is provided to shield internal components of the mode selector assembly 66 from the environment. An actuator 82 is provided on the exterior of the mode selector assembly 66 to permit a user to adjust the mode selector assembly 66 between operation modes, as discussed below. With reference to FIGS. 5 and 6, the actuator 82 can be defined by a lever 82 that is coupled to the first end 86*a* of the bar linkage 86. As will be appreciated by one of ordinary skill in the art, movement of the lever 82 causes movement of the valve plate 90 due to the connection of the second end 86*b* of the bar linkage 86 to the valve plate 90.

Referring to FIG. 6, the actuator 82 is connected to a first end 86*a* of a bar linkage 86. Movement of the actuator 82 causes movement of the bar linkage 86. The second end 86*b* of the bar linkage 86 is connected to a valve plate 90 of the mode selector assembly 66. The valve plate 90 has a center portion 90*a* and a peripheral portion 90*b* spaced apart radially from the center portion 90*a*. The second end 86*b* of the bar linkage 86 is connected to the peripheral portion 90*b*. As the actuator 82 is rotated, the bar linkage 86 causes rotation of the valve plate 90 and the center portion 90*a*. The center portion 90*a* of the valve plate 90 is secured to a valve 94 of the mode selector assembly 66 for co-rotation therewith.

Figure 7:
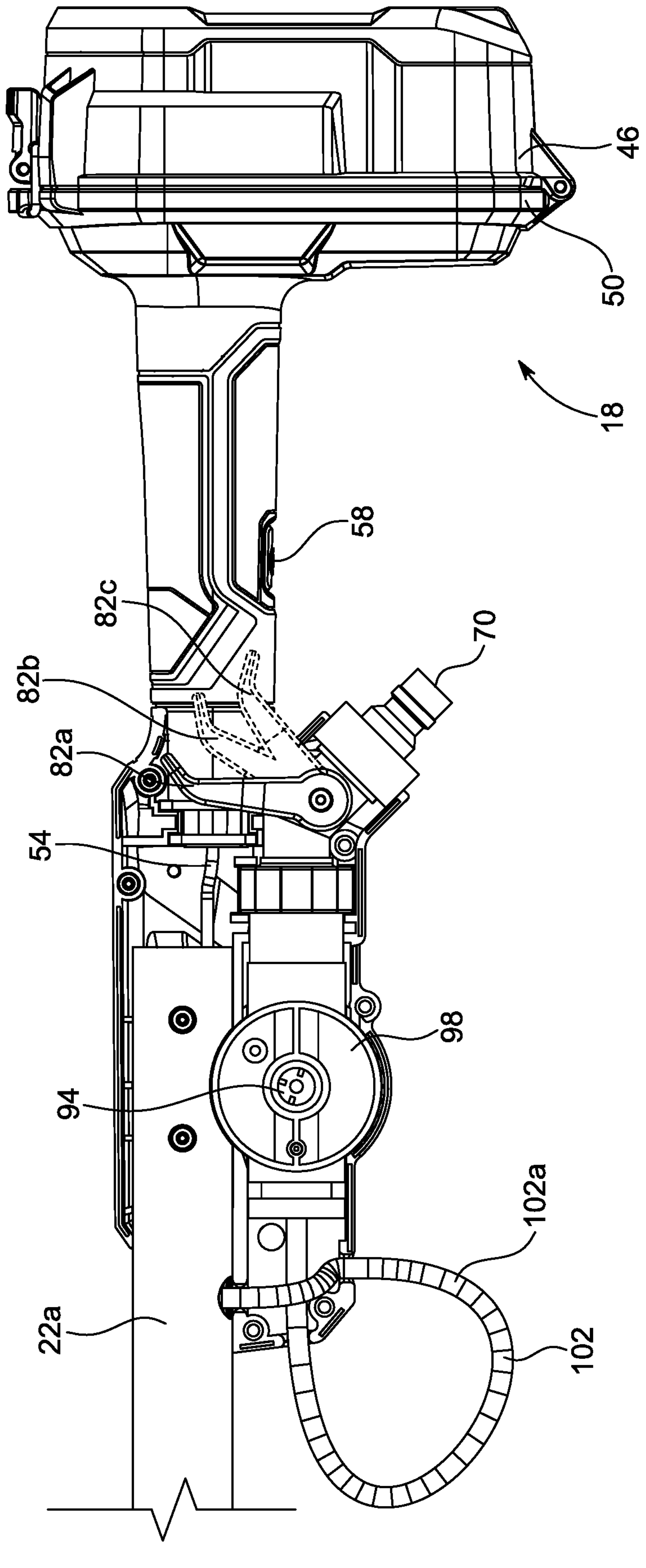
FIG. 7 is a side view of the fluid dispensing scrubber of FIG. 5, with the cover plate and a valve plate removed and illustrating the mode selector assembly.
Figure 8:
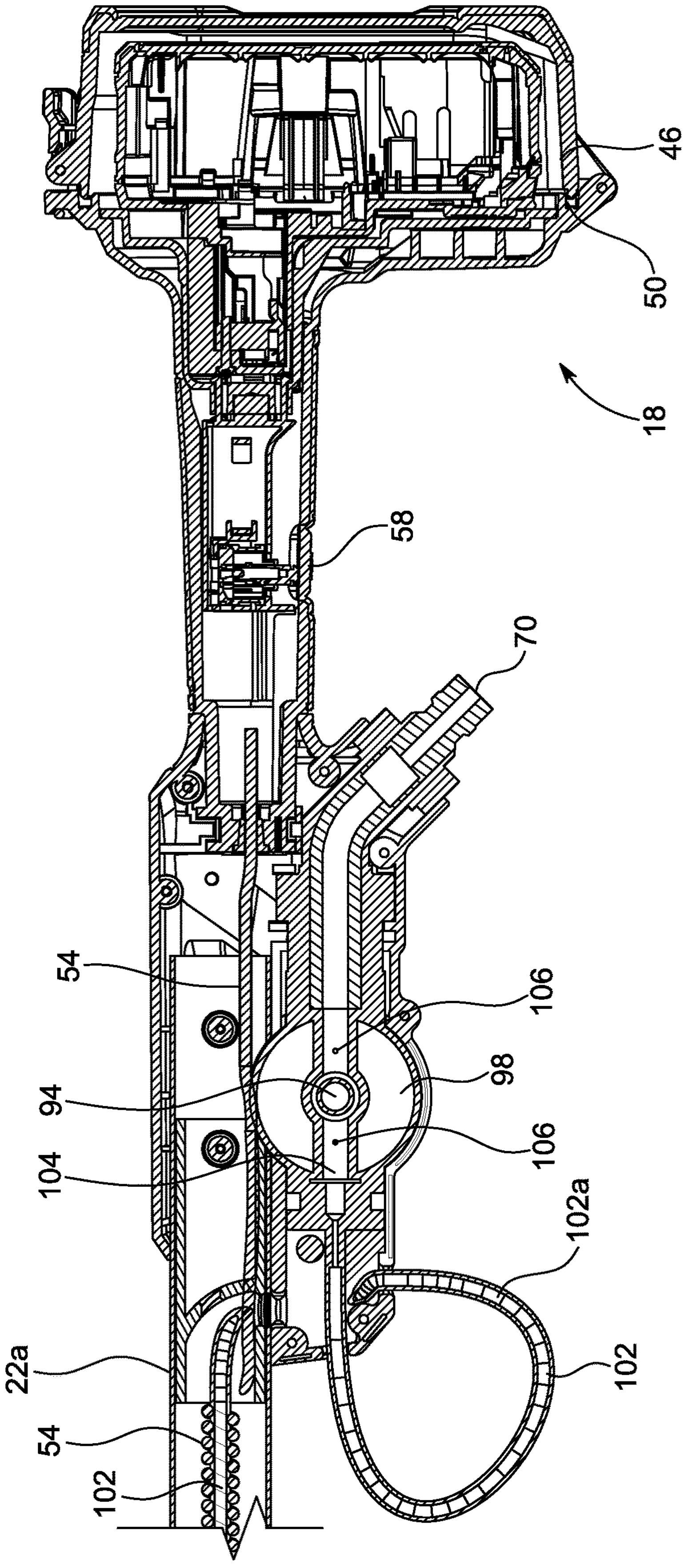
FIG. 8 is a cross-sectional view of the fluid dispensing scrubber viewed section line 8-8 in FIG. 1.
Figure 9:
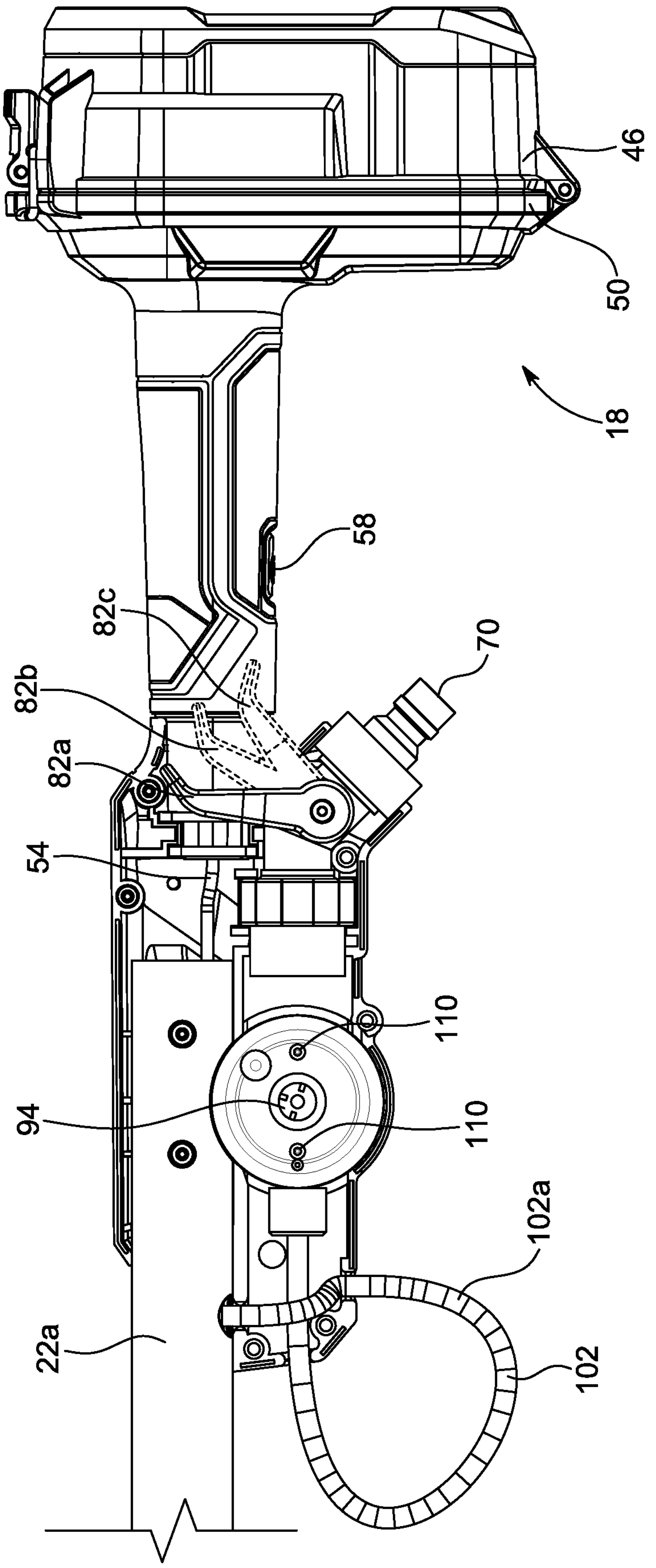
FIG. 9 is side view of the fluid dispensing scrubber of FIG. 5, with the cover plate, valve plate, and a chamber removed and illustrating the mode selector assembly.
Figure 10:
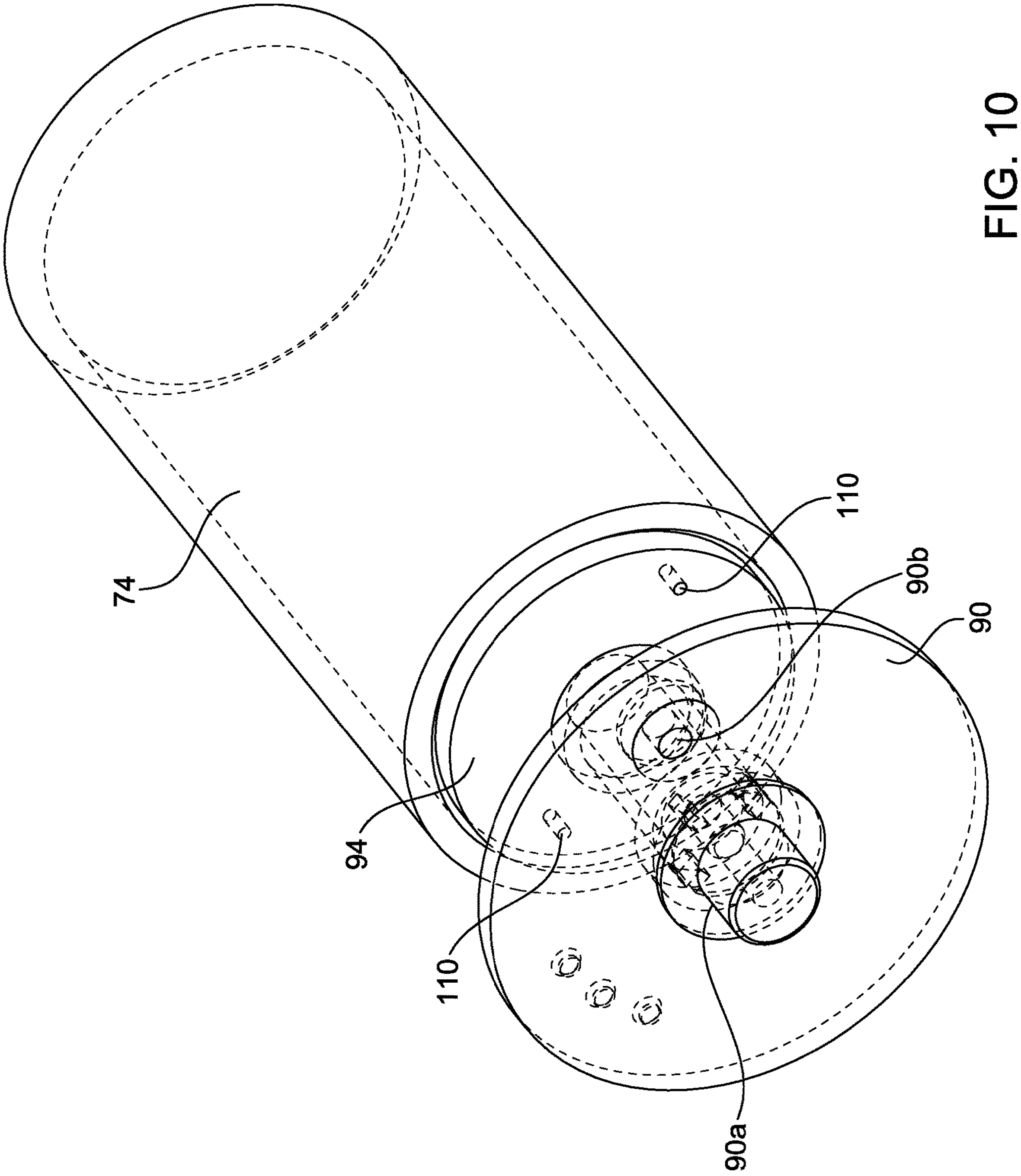
FIG. 10 is a perspective view of components of the mode selector assembly including the valve plate, a valve, and a reservoir.

FIG. 7 illustrates the mode selector assembly 66 with the valve plate 90 removed. A chamber 98 is provided between the fluid inlet nozzle 70 and a tube 102. The chamber 98 is also provided adjacent the reservoir 74 (FIG. 2). With reference to FIGS. 8 and 9, the chamber 98 includes passages or holes 106 to communicate a fluid (e.g., a cleaning agent such as soap, bleach, etc.) to the tube 102. The holes 106 are aligned with a passageway 104 that fluidly interconnects the inlet nozzle 70 and the tube 102. The holes 106 are configured to align with valve holes 110 when the actuator 82 is in a first or cleaning agent position 82*a* such that when the valve 94 is open, the holes 106 are aligned. As the actuator 82 moves the valve 94 out of the first position 82*a*, the holes 106 become misaligned with the valve holes 110, and fluid from the reservoir 74 is restricted from entry into the passageway 104. The valve holes 110 are best illustrated in FIGS. 9 and 10. When the holes 106 and the valve holes 110 are aligned, flow of inlet fluid from the fluid inlet nozzle 70 draws soap from the reservoir 74 into the passageway 104. As illustrated in FIG. 8, the tube 102 has a base end portion 102*a* that is exterior to the valve housing and passes into the telescopic shaft 22. The tube 102 passes to the scrubbing end 14.

In a first mode of the scrubber 10 (e.g., a cleaning agent mode), the mode selector assembly 66 is configured to allow a combination of a fluid (e.g., a cleaning agent) from the reservoir 74 and water (or any inlet fluid) from the fluid inlet nozzle 70 to flow to the tube 102. In the first mode, the fluid dispensing scrubber 10 dispenses a mixture of cleaning agent and water. In a second mode of the scrubber 10 (e.g., a rinse mode), the mode selector assembly 66 is configured to restrict flow of the cleaning agent from the reservoir 74 to the tube 102 and to permit water from the fluid inlet nozzle 70 to enter the tube 102. In the second mode, water flushes residual cleaning agent from within the scrubber 10. In a third mode of the scrubber 10 (e.g., a scrub mode), the motor 38 receives power from the battery pack 46 to rotate the brush 42. In some embodiments, the brush 42 may be operated in the scrub mode without dispensing cleaning agent from the reservoir 74 or water from the inlet nozzle 70. The motor 38 and the brush 42 may also be rotated in the first mode and/or the second mode.

The actuator 82 is moved to a second or rinse position 82*b* to enter the second mode. In the second position 82*b*, the valve plate 90 is rotated such that the holes 106 and the valve holes 110 are misaligned such that cleaning agent is restricted from entering the passageway 104.

The actuator 82 is moved to a third position 82*c* to enter the third mode. In the third position 82*c*, the valve plate 90 is rotated such that the valve 94 restricts fluid from entering the tube 102 from the passageway 104.

Referring again to FIG. 4, a scrubbing end portion 102*b* of the tube 102 opposes the base end portion 102*a* of the tube 102. The scrubbing end portion 102*b* is placed in fluid communication with a dispensing nozzle 118 configured to outlet fluid from the tube 102 adjacent the brush 42. The dispensing nozzle 118 is external to (i.e., spaced apart from) both the scrubber head 34 and the telescopic shaft 22. The scrubbing end portion 102*b* projects from the telescopic shaft 22 to the exterior of the scrubber 10. In the illustrated embodiment, the dispensing nozzle 118 is secured to the scrubber head 34 by a yoke mechanism 114. The yoke mechanism 114 is pivotable relative to the scrubber head 34. A reference line RL2 extends through the dispensing nozzle 118. An angle Θ2 is disposed between the longitudinal axis LA and the reference line RL2. The yoke mechanism 114 permits the dispensing nozzle 118 to be adjustable relative to the scrubber head 34. Additionally, the yoke mechanism 114 permits the dispensing nozzle 118 to be adjustable relative to the longitudinal axis LA. In some constructions, the yoke mechanism 114 is lockable in a desired position to secure the angle Θ2 during operation of the scrubber 10. In some constructions, the yoke mechanism 114 is operable to permit the dispensing nozzle 118 to extend in a direction parallel with the scrubber head 34. In other words, the angle Θ2 between the longitudinal axis LA and the reference line RL2 of the dispensing nozzle 118 may be made equal to the angle Θ1 between the longitudinal axis LA and the reference line RL1 of the scrubber head 34.

FIGS. 11-15 illustrate a power scrubber 410 according to another embodiment. The scrubber 410 is similar in some aspects to the scrubber 10 described with respect to FIGS. 1-10, and similar features are identified with similar reference numbers, plus 400. Some similarities and differences of the scrubber 410 are described herein.

Figure 11:
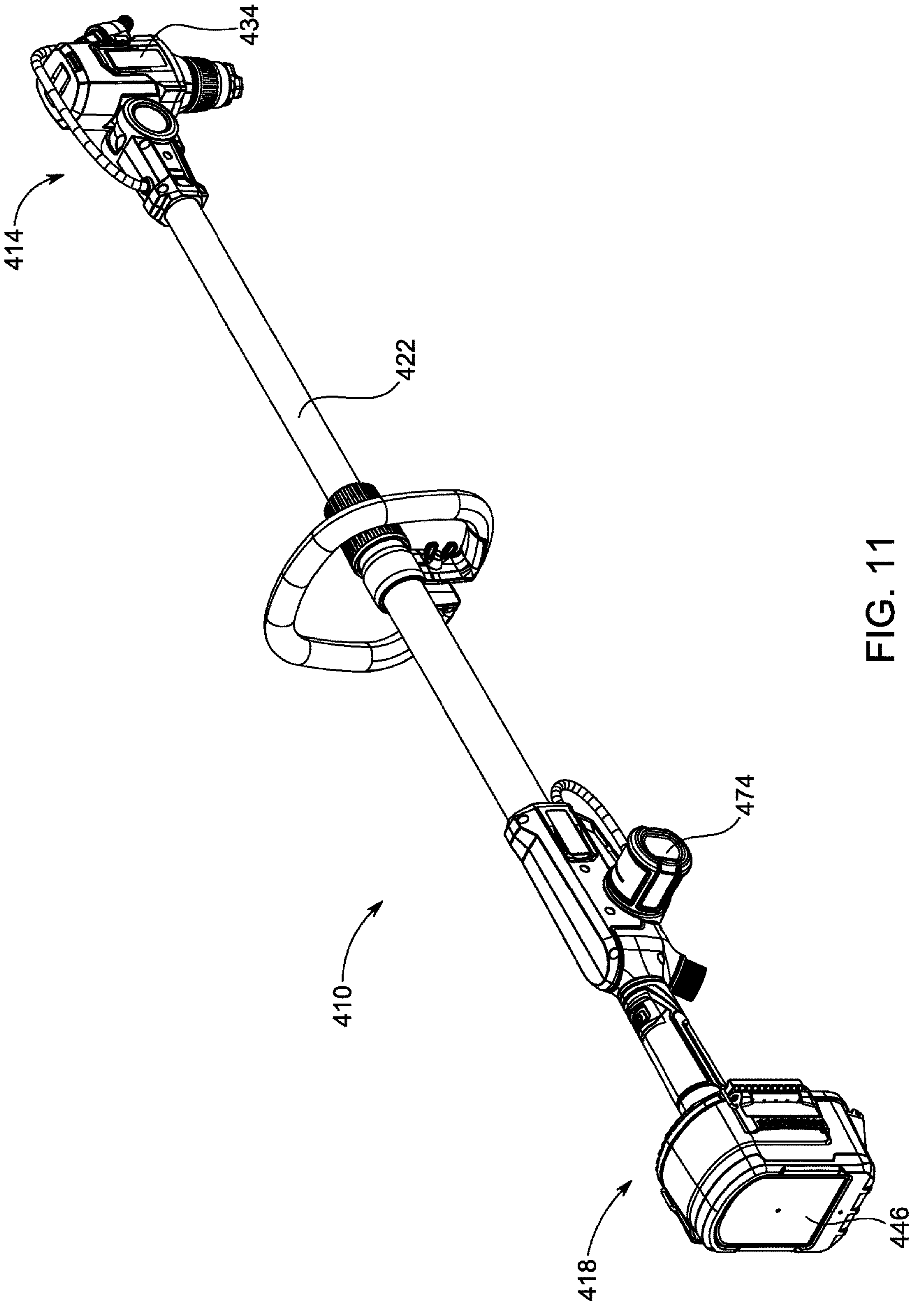
FIG. 11 is a perspective view of a fluid dispensing scrubber according to another embodiment.

As shown in FIG. 11, the scrubber 410 includes a first end or scrubbing end 414 and a second end or base end 418. A shaft 422 connects the scrubbing end 414 to the base end 418. A scrubber head 434 is positioned adjacent the scrubbing end 414 and supports a motor and brush (not shown). A battery pack 446 is positioned adjacent the base end 418.

Figure 12:
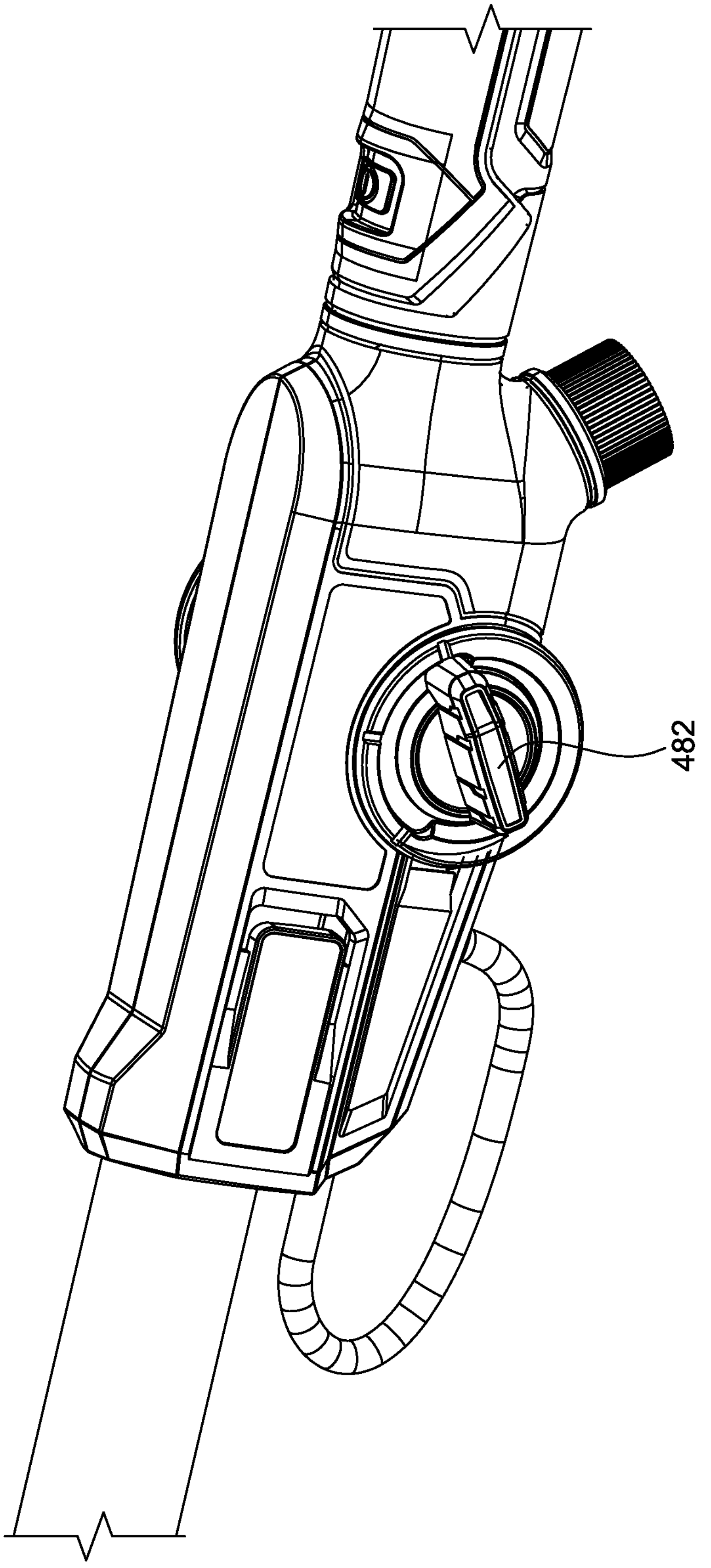
FIG. 12 is an enlarged perspective view of a portion of the fluid dispensing scrubber of FIG. 11.
Figure 13:
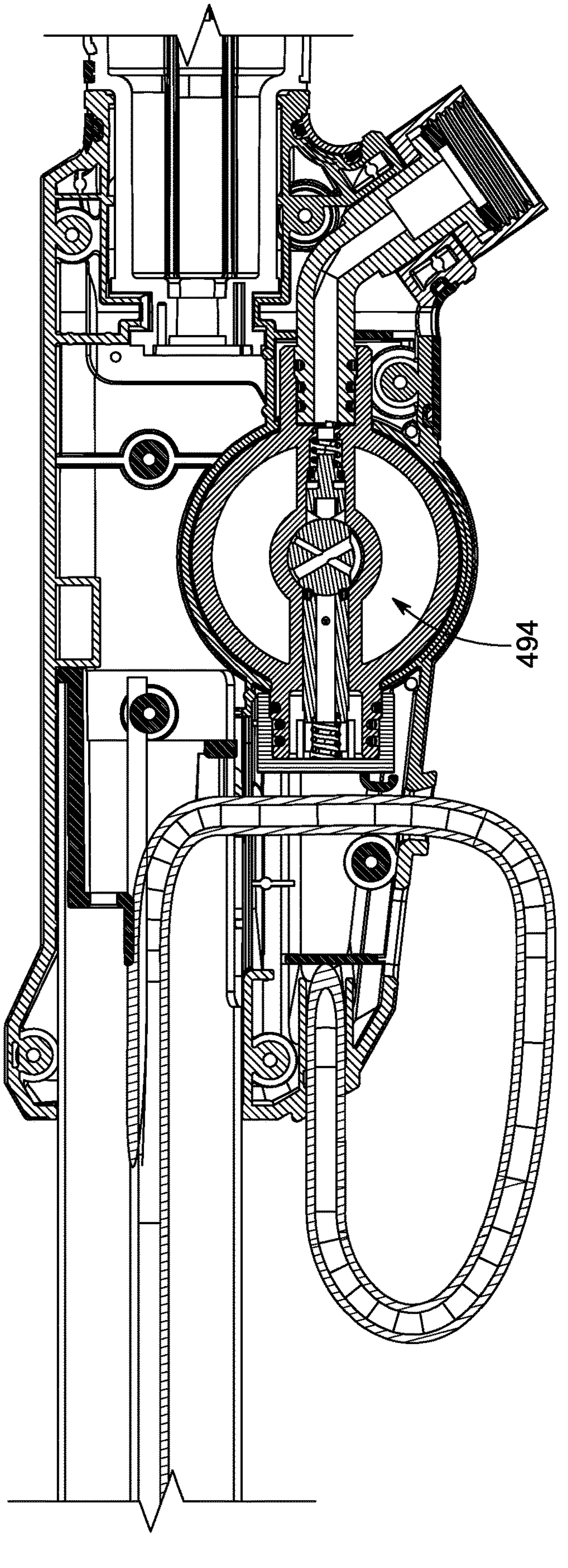
FIG. 13 is a section view of the portion of the fluid dispensing scrubber of FIG. 12, viewed along section 13-13.
Figure 14:
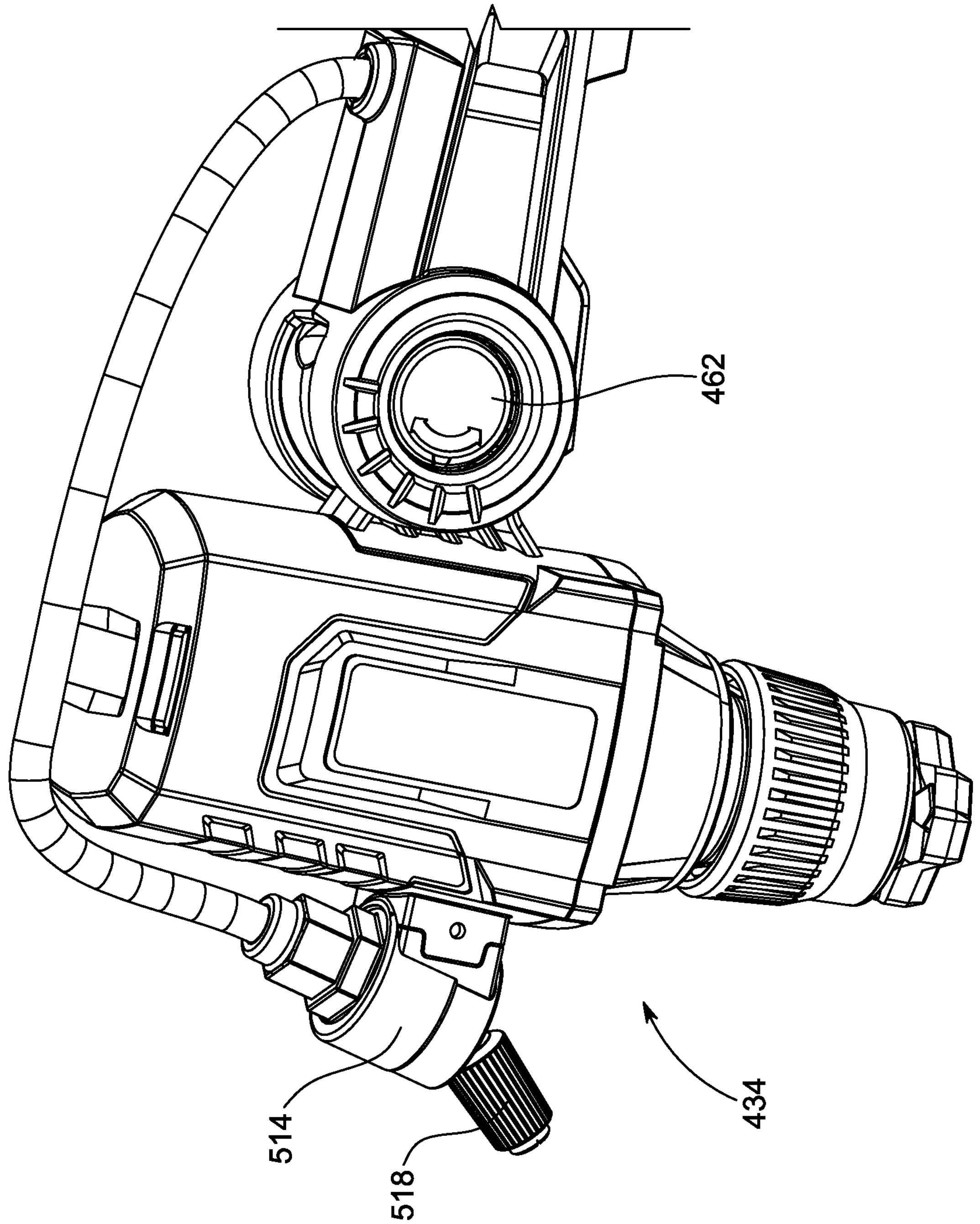
FIG. 14 is an enlarged perspective view of a portion of the fluid dispensing scrubber of FIG. 11.
Figure 15:
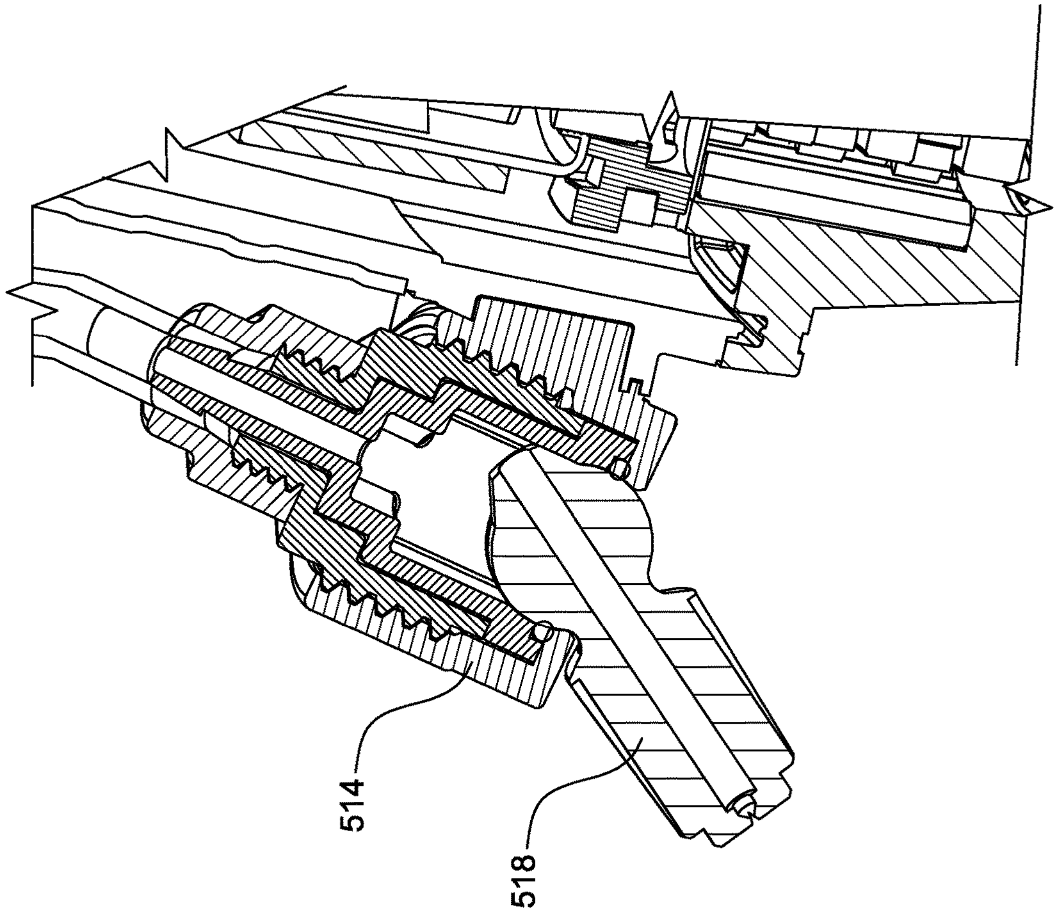
FIG. 15 is a section view of the portion of the fluid dispensing scrubber of FIG. 11, viewed along section 15-15.

As shown in FIG. 12, an actuator 482 can be formed as a knob 482 that is aligned with the valve 494 (FIG. 13) such that rotation of the knob 482 moves the valve 494 between a first mode (e.g., a cleaning agent mode), a second mode (e.g., a rinse mode), and a third mode (e.g., a scrub mode). Also, as shown in FIGS. 14 and 15, the scrubber head 434 is supported on a pivot joint 462, and a dispensing nozzle 518 is supported on the scrubber head 434 by a yoke 514. The yoke 514 is secured in a predetermined orientation relative to the scrubber head 434 to maintain the spray from the nozzle 518 at a desired orientation relative to the brush. In addition, in the illustrated embodiment the nozzle 518 is coupled to the yoke 514 by a quick coupling (e.g., a ball-in-socket coupling) that permits the nozzle to be disconnected easily without breaking and to be reinstalled. In some embodiments, this facilitates compact packaging and shipping.

Although aspects have been described in detail with reference to certain embodiments, variations and modifications exist within the scope of one or more independent aspects as described.

What is claimed is:

1. A fluid dispensing scrubber comprising:
- a shaft including a first end and a second end;
- a fluid inlet for receiving a first fluid from an external source;
- a reservoir configured to store a second fluid different from the first fluid;
- a valve assembly configured to selectively mix the first fluid and the second fluid;
- a scrubbing head supported adjacent the first end of the shaft, the scrubbing head including a brush and a motor operable to rotate the brush;
- a battery pack supported adjacent the second end, the battery pack operable to provide power to the motor; and
- a dispensing nozzle configured to dispense one or both of the first fluid and the second fluid, the dispensing nozzle supported on an exterior surface of the scrubbing head by a yoke pivotably coupled to the scrubbing head to permit adjustment of an orientation of the dispensing nozzle relative to the scrubbing head.

2. The fluid dispensing scrubber of claim 1, wherein the fluid dispensing nozzle is selectively secured against movement relative to the scrubbing head.

3. The fluid dispensing scrubber of claim 1, wherein the fluid dispensing nozzle is coupled to the scrubbing head by a ball-in-socket coupling to facilitate quick connection and disconnection.

4. The fluid dispensing scrubber of claim 1, wherein the valve assembly is movable between a first mode, a second mode, and a third mode, wherein, in the first mode, the valve assembly permits a mixture of the first fluid and the second fluid to be dispensed from the dispensing nozzle, wherein, in the second mode, the valve assembly permits only the first fluid to be dispensed from the dispensing nozzle, wherein, in the third mode, the valve assembly prevents the first fluid from being dispensed from the dispensing nozzle.

5. The fluid dispensing scrubber of claim 4, wherein the motor rotates the brush in at least the third mode.

6. The fluid dispensing scrubber of claim 4, wherein the motor rotates the brush in at least the first mode and the third mode.

7. The fluid dispensing scrubber of claim 1, wherein the valve assembly includes an actuator configured to move a valve member, wherein while the valve assembly is in a first mode, the valve member provides fluid communication between at least one opening and a passageway to permit ingress of the second fluid from the reservoir into the passageway to mix with the first fluid.

8. A fluid dispensing scrubber comprising:
- a shaft including a first end and a second end;
- a scrubbing head supported adjacent the first end of the shaft, the scrubbing head including a brush and a motor operable to rotate the brush;
- a dispensing nozzle external to the scrubbing head;
- a battery pack supported adjacent the second end, the battery pack operable to provide power to the motor;
- a fluid inlet configured to receive a first fluid from an external source;
- a reservoir configured to store a second fluid different from the first fluid; and
- a valve assembly configured to selectively mix the first fluid and the second fluid, the valve assembly movable between a first mode, a second mode, and a third mode,
- wherein, in the first mode, the valve assembly permits a mixture of the first fluid and the second fluid to be dispensed from the dispensing nozzle,
- wherein, in the second mode, the valve assembly permits only the first fluid to be dispensed from the dispensing nozzle,
- wherein, in the third mode, the valve assembly prevents the first fluid from being dispensed from the dispensing nozzle and the motor rotates the brush such that the third mode is a scrub mode, wherein the valve assembly includes a valve member and an actuator for moving the valve member, wherein while the valve assembly is in the first mode, the valve member provides fluid communication between at least one opening and a passageway to permit ingress of the second fluid from the reservoir into the passageway to mix with the first fluid, and wherein the actuator includes a linkage and a lever coupled to a first end of the linkage, wherein the valve member is connected to a second end of the linkage, and wherein movement of the lever causes movement of the valve member.

9. The fluid dispensing scrubber of claim 8, wherein the motor rotates the brush in at least the first mode and the third mode.

10. The fluid dispensing scrubber of claim 8, wherein the motor rotates the brush in each of the first mode, the second mode, and the third mode.

11. The fluid dispensing scrubber of claim 8, wherein the at least one opening and the passageway are operable to receive the first fluid from the fluid inlet, and wherein the valve member includes a valve plate that is movable by the actuator to align the opening with an entry hole of the valve plate to permit ingress of the second fluid into the passageway.

12. A fluid dispensing scrubber comprising:

a shaft including a first end and a second end, the shaft including a first portion and a second portion slidably coupled to the first portion;

a grip portion coupled to the shaft;

a pivot joint positioned adjacent the first end of the shaft;

a fluid inlet configured to receive a first fluid from an external source;

a reservoir configured to store a second fluid different from the first fluid;

a valve assembly configured to selectively mix the first fluid and the second fluid;

a scrubbing head coupled to the pivot joint, the scrubbing head pivotable relative to the shaft, the scrubbing head including a brush, a motor, and a chuck operable to be rotated by the motor, the chuck coupled to the brush and transmitting a torque from the motor to the brush;

a battery pack supported adjacent the second end of the shaft, the battery pack operable to provide power to the motor; and a dispensing nozzle configured to dispense one or both of the first fluid and the second fluid, the dispensing nozzle supported on an exterior surface of the scrubbing head by a yoke pivotably coupled to the scrubbing head to permit adjustment of an orientation of the dispensing nozzle relative to the scrubbing head.

13. The fluid dispensing scrubber of claim 12, wherein the dispensing nozzle is secured against movement relative to the scrubbing head.

14. The fluid dispensing scrubber of claim 12, wherein the dispensing nozzle is coupled to the scrubbing head by a ball-in-socket coupling to facilitate quick connection and quick disconnection.

15. The fluid dispensing scrubber of claim 12, wherein the valve assembly is movable between a first mode, a second mode, and a third mode, wherein, in the first mode, the valve assembly permits a mixture of the first fluid and the second fluid to be dispensed from the dispensing nozzle, wherein, in the second mode, the valve assembly permits only the first fluid to be dispensed from the dispensing nozzle, and wherein, in the third mode, the valve assembly prevents the first fluid from being dispensed from the dispensing nozzle.

* * * * *